(12) United States Patent
Hajjar et al.

(10) Patent No.: US 9,995,997 B2
(45) Date of Patent: Jun. 12, 2018

(54) SEAMLESS EMISSION TILE QUILT

(71) Applicant: PRYSM, Inc., San Jose, CA (US)

(72) Inventors: Roger A. Hajjar, San Jose, CA (US); Philip J. Ralli, Sudbury, MA (US); John L. Ritter, Harvard, MA (US)

(73) Assignee: PRYSM, Inc., San Jose, CA (US)

( * ) Notice: Subject to any disclaimer, the term of this patent is extended or adjusted under 35 U.S.C. 154(b) by 332 days.

(21) Appl. No.: 14/432,140

(22) PCT Filed: Oct. 2, 2013

(86) PCT No.: PCT/US2013/063139
§ 371 (c)(1),
(2) Date: Mar. 27, 2015

(87) PCT Pub. No.: WO2014/055698
PCT Pub. Date: Apr. 10, 2014

(65) Prior Publication Data
US 2015/0241765 A1 Aug. 27, 2015

Related U.S. Application Data

(60) Provisional application No. 61/744,910, filed on Oct. 3, 2012.

(51) Int. Cl.
*G03B 21/604* (2014.01)
*G03B 21/56* (2006.01)
(Continued)

(52) U.S. Cl.
CPC ....... *G03B 21/604* (2013.01); *G02B 27/2214* (2013.01); *G03B 21/567* (2013.01);
(Continued)

(58) Field of Classification Search
CPC .... G03B 21/604; G03B 21/56; G03B 21/567; H04N 9/3129
(Continued)

(56) References Cited

U.S. PATENT DOCUMENTS 6,873,380 B2  3/2005  Matthies et al.
8,233,217 B2  7/2012  Kindler et al.
(Continued)

FOREIGN PATENT DOCUMENTS

CN  1575059 A  2/2005
CN  102667583 A  9/2012

OTHER PUBLICATIONS

Chinese Office Action dated Dec. 12, 2016 for Chinese Application No. 201380051991.X.
(Continued)

*Primary Examiner* — Christopher Mahoney
(74) *Attorney, Agent, or Firm* — Patterson + Sheridan, LLP

(57) ABSTRACT

A multi-layer display screen capable of being tiled without a visible gap between tiled screens and methods of using said device are described herein. In one embodiment, a system includes a light generator configured to produce light and a multi-layer screen with a plurality of layers. The multi-layer screen can be configured to permit the light from the light generator to propagate therethrough. The plurality of layers can include an opaque region layer having a plurality of opaque regions and a first layer comprising one or more abutted layers disposed within a common plane, the abutted layers spaced apart by a gap, wherein the gap is coincident with the opaque region.

21 Claims, 4 Drawing Sheets

(51) Int. Cl.
  *G03B 21/62* (2014.01)
  *H04N 9/31* (2006.01)
  *G02B 27/22* (2018.01)
  *H04N 13/04* (2006.01)
(52) U.S. Cl.
  CPC ........... *G03B 21/62* (2013.01); *H04N 9/3129* (2013.01); *H04N 13/0402* (2013.01); *H04N 13/0422* (2013.01); *H04N 13/0434* (2013.01); *H04N 2213/001* (2013.01)
(58) Field of Classification Search
  USPC ......................................................... 359/443
  See application file for complete search history.

(56) References Cited

U.S. PATENT DOCUMENTS

| | | |
|---|---|---|
| 9,291,887 B2 * | 3/2016 | Hajjar .................... G03B 21/58 |
| 2010/0123384 A1 | 5/2010 | Miller et al. |
| 2012/0242949 A1 | 9/2012 | Chen |

OTHER PUBLICATIONS

International Search Report and Written Opinion in corresponding application No. PCT/US2013/063139, dated Feb. 27, 2014.
Chinese Office Action (with attached English translation) for Application No. 201380051991.X; dated Aug. 30, 2017; 12 total pages.
United Kingdom Intellectual Property Office; Examination Report for Application No. GB1505708.6; dated Mar. 7, 2017; 3 total pages.

* cited by examiner

SEAMLESS EMISSION TILE QUILT

BACKGROUND OF THE INVENTION

Field of the Invention

Embodiments described herein generally relate to the use of display screens. More specifically, embodiments generally relate to a large format display transmissive and self-emissive screen.

Description of the Related Art

Electronic display systems, including stereo display systems, are commonly used to display information from computers and other sources. Typical display systems range in size from small displays used in mobile devices to very large displays, such as tiled displays, that are used to display large size images and video. Tiled display systems are generally made up of multiple smaller individual display devices, or "tiles", that are carefully aligned when assembled to provide a seamless and uniform appearance. In some embodiments, each tile may be a light-based electronic display device, such as a laser-phosphor display (LPD), including a self-contained laser-based image-generating system.

The LPD screen is typically a set of distinct passive material layers. Each layer serves a different contributing purpose to the making of a laser phosphor display screen. If the desired screen size is a fixed size larger than an individual LPD screen, the fixed size requires the abutting or tiling of these fixed sized screens together. This results in a discernible line at the seam between the distinct tiled screens. One possible technique involves taping which involves an adhesive holding two abutted layers together. The problem with taping for translucent or transparent layers is that as light shines through, the tape and its edges are visible to the viewer in the form of discoloration and brightness change without considerations to impinging and emitted light.

Epoxies or adhesives are also used to hold abutted seams together by laminating multiple films on one large transmissive surface. However, this process does not lend itself to accurate and uniform placement of the screen tiles due to epoxy non-uniformity or shifts during lamination for a very large surfaces. Additionally, epoxies and adhesives on a large plane tend to have imperfections that, when the light shines through, will reveal discontinuities.

Accordingly, there is a need in the art for systems and methods of tiling multi-layer transmissive screens without the noticed seam. Further, there is a need in the art for stereo imaging from light phosphor displays or other multi-layer screens.

SUMMARY OF THE INVENTION

The invention described herein generally relates to presentation of images, both as a standard image and as a stereo image, from a plurality of tiled displays. In one embodiment, a system can include a light generator configured to produce light; and a multi-layer screen with a plurality of layers, the multi-layer screen configured to permit the light from the light generator to propagate therethrough. The plurality of layers can include an opaque region layer having a plurality of opaque regions and a first layer comprising one or more abutted layers on a common plane, the abutted layers spaced apart by a gap, wherein the gap is coincident with the opaque region.

In another embodiment, a system can include a light generator configured to produce and direct light and a plurality of multi-layer screens. The system comprises a light generator, a multi-layer screen which permits light from the light generator to propagate through at least one or more layers of the multi-layer screen where at least one layer is an opaque region layer, comprising at least a first one dimensional opaque region with a width, and a first layer within the multi-layer screen, where the first layer is two films abutted against each other, the abutment includes a first film layer gap between the two films, wherein the first film layer gap between the two films is coincident with the first opaque region.

In another embodiment a system is provided. The system comprises a light generator, a multi-layer screen which permits light from the light generator to propagate through at least one or more layers of the multi-layer screen where at least one layer is scanned by a nearly fixed aperture sized beam of light along a first scan line, and a first layer within the multi-layer screen, where the first layer is two films abutted against each other, the abutment includes a first film layer gap between the two films where the first film layer gap between the two films is parallel with the scan line.

Each multi-layer screen can include a servo layer having a first edge and configured to provide feedback, a second layer with a second edge and a filter layer having a third edge and configured to filter a wavelength of light received from at least the light generator, wherein at least one of the first edge, the second edge and the third edge extends beyond one of the remaining edges. The plurality of multi-layer screens can be configured to connect between the first edge, the second edge and the third edge of the corresponding screen to create a first gap, a second gap and a third gap respectively, wherein at least one of the first gap, the second gap and the third gap are positioned such that light which passes through the respective gap is directed to the standoffs.

In another embodiment, a system can include a light generator configured to produce light at a first wavelength and a plurality of multi-layer screens, each multi-layer screen including a filter layer having a first edge, a second layer having a second edge, and a servo layer having a third edge and positioned in connection with the second side of the phosphor layer and configured to provide feedback to the light engine control system, wherein at least two of the first edge, the second edge and the third edge are not coincident, and wherein at least one of the first edge, the second edge and the third edge are formed coincident with one of the plurality of standoff dividers. The second layer can include a first side, a second side positioned opposite the first side and a plurality of light propagation regions positioned in connection with the first side.

In another embodiment, a system can include a light generator configured to produce light and a multi-layer screen with a plurality of layers, the multi-layer screen configured to permit the light from the light generator to propagate therethrough. The plurality of layers can include a first light propagation layer having a plurality of first light propagation regions and a plurality of second light propagation regions and a second layer comprising one or more abutted layers disposed within a common plane, wherein the abutted edges of each of the abutted layers spaced apart by a first gap, wherein the first gap is coincident with a first layer first light propagation region.

In another embodiment, a system can include a light generator configured to produce and direct light and a plurality of multi-layer screens. Each multi-layer screen can include a servo layer configured to provide feedback and having a first edge, a second layer configured to deliver visible light to a viewer, configured to have two or more opaque light propagation regions and having a second edge, a filter layer configured to filter a wavelength of light received from at least the light generator and having a third edge, wherein the first edge and the second edge are not coinciding with the third edge and the plurality of multi-layer screens being configured to connect between at least the first edge, the second edge and the third edge of the corresponding screen to create a first gap, a second gap and a third gap respectively, wherein at least one of the first gap, the second gap and the third gap are configured adjacent to one or more opaque light propagation regions.

In another embodiment, a system can include a light generator configured to produce a scanning light and a multi-layer screen with a plurality of layers, the multi-layer screen configured to permit the light from the light generator to propagate therethrough. The plurality of layers can include a first light propagation layer having a plurality of first light propagation regions and a plurality of second light propagation regions. and a second layer comprising two or more abutted layers disposed within a common plane comprising a first layer comprising a first abutted edge and a second layer comprising a second abutted edge, the first abutted edge and the second abutted edge having a common plane and spaced apart by a first gap, wherein the first gap is coincident with the first light propagation region of the first light propagation layer; and the second layer comprising a third abutted edge and a third layer comprising a fourth abutted edge, the third abutted edge and the fourth abutted edge having a common plane and spaced apart by a second gap, wherein the second gap is coincident with a scan line, and wherein at least one layer is scanned by a nearly fixed aperture sized beam of light along the scan line.

In another embodiment, a system can include a light generator configured to produce light, a multi-layer screen configured to permit light from the light generator to propagate through at least one or more layers of the multi-layer screen where at least one layer is scanned by a nearly fixed aperture sized beam of light along a first scan line and a first layer plane within the multi-layer screen, the first layer plane comprising two layers, wherein the edge of each of two layers within the plane abut against each other creating a first layer plane gap between the two layers, and wherein the first layer plane gap between the two films is coincident with the first scan line. In a further embodiment, the light generator can be further configured to render image information in producing the scan line in line with the second gap. In a further embodiment, the light generator is further configured to render image information in producing the scan line not in line with the second gap.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of the inventions and are therefore not to be considered limiting of its scope, for the invention may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
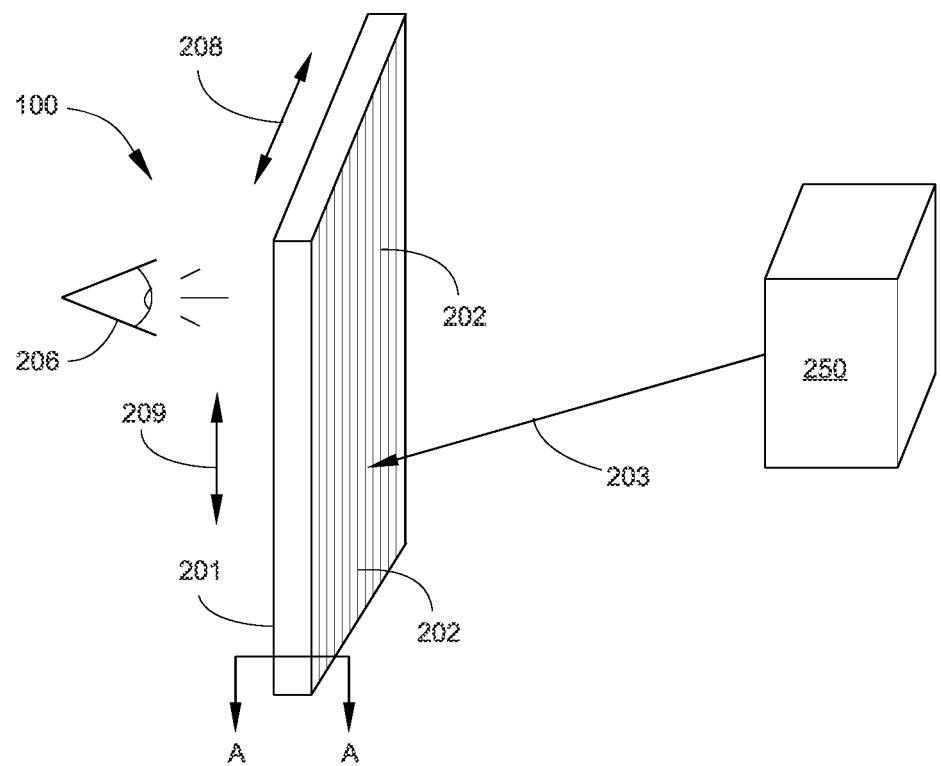
FIG. 1 is a perspective schematic diagram of a display system, according to one embodiment.

Certain embodiments disclosed herein describe a multi-layer tiled screen and a method of forming and using said screen, which can produce one or more simultaneous images. The various layers of the multi-layer screen include one or more edges which, when the screens are abutted to one another, form a continuous large screen with common gap between the layers of the screen. By controlling the position of the edges and corresponding gaps, both in relation to the region of the screen and other gaps, visibility of those gaps to the viewer can be diminished.

Certain embodiments described herein include tiling the various sheet layers of the screen (seam) at different locations from each other. In addition, each seam or layer edge should occur in a position on the layer stack between regions of emitting light. This technique not only allows the screen to end up being as large as the number of sheeted layers stitched together, but the seams being between regions of emitting light, which are opaque regions of the screen hides the seam from the viewer.

The screen tiles are typically several layers comprising various filter layers, phosphor layers and/or standoff layers. These layers being of various thickness and conventionally having a common edge exhibit forms of internal reflections that when the screen edges are brought together, exhibit a luminance and/or color discontinuity. Several approaches are employed to reduce the discontinuity and to effectively make a continuous screen. One key parameter is to reduce the thickness of the layers as edge height which is the layer thickness causes light to change direction to the viewer. One way to accomplish this is by making formerly glass layers, thin plastic layers. A second key parameter involves the staggering of the layers, so the layers do not share a common edge, but one layer extends beyond the layer adjacent layers, so each layer is the only edge in a stack. A third key parameter is to place the staggered edges in opaque regions to be defined later.

Gap—The term "gap" is intended to include any opening formed between two or more abutting edges between two sheet or sheet layers surfaces. In one embodiment, two edges can form a gap.

Layer adjacent—The phrase "Layer adjacent" is a descriptive term used to denote an adjacency between the surfaces of two layers, such as between a first layer and a second layer of a multi-layer screen. In one example, two rectangular layers, each having two surfaces and four edges, are layer adjacent when positioned with one surface of the first layer is in contact with one surface of the second layer. Layer adjacent can also correspond to portions of a layer, such as when a portion of the surface of a first layer being layer adjacent to a portion of a surface of a second layer.

The multi-layer tiled displays can then be configured to produce stereo images, either with a distinct left eye right eye filter layer or other means. Current LPD, systems can provide for high resolution, high brightness and high contrast viewing on extremely large viewing area with a low comparative overall cost of ownership. By adding a polarizing film to the display screen with (for example) a patterned polarization, the optimal qualities of the LPD or array of displays can be extended to include multiple image viewing, such as viewing of separate images on the screen by different viewers or 3D image production. Embodiments of the claimed inventions are more clearly described with reference to the figures below.

FIG. 1 is a perspective schematic diagram of a display system 100, according to embodiments of the invention. Display system 100 is a light-based electronic display device configured to produce video and static images for a viewer 206. The display system 100 can incorporate light-emitting phosphors. For example, display system 100 may be a LPD or other phosphor-based display device. In some embodiments, display system 100 is one of a plurality of display systems that are arranged to form a single tiled display screen.

In one embodiment, the display system 100 can have a screen 201 with phosphor stripes 202 and a laser module 250 that is used to produce one or more scanning laser beams 203 to excite the phosphor material on screen 201. Phosphor stripes 202 are made up of alternating phosphor stripes of different colors, e.g., red, green, and blue, where the colors are selected so that they can be combined to form white light and other colors of light. Scanning laser beam 203 is a modulated light beam that includes optical pulse width and/or amplitude variable pulses that carry image information and is scanned across screen 201 along two orthogonal directions, e.g., horizontally (parallel to arrow 208) and vertically (parallel to arrow 209), in a raster scanning pattern to produce an image on screen 201 for viewer 206. In some embodiments, scanning laser beam 203 includes visible lasers beams of different colors that discretely illuminate individual pixel elements of screen 201 to produce an image. The scanning laser beam 203 can be of a specific width and height, so as to excite only a specific phosphor or group of phosphors at one time, such as a scanning laser beam which is approximately 700 µm tall and approximately 100 µm wide. In other embodiments, scanning laser beam 203 includes invisible laser beams, such as near-violet or ultraviolet (UV) laser beams, that act as excitation beams to excite phosphors on the screen. In such embodiments, scanning laser beam 203 is directed to discrete pixel elements that are formed from phosphor stripes 202 or to portions of phosphor stripes 202 that act as discrete pixel elements and are made up of light-emitting material that absorbs optical energy from scanning laser beam 203 to emit visible light and produce an image. Alternatively, the phosphor stripes may be segmented phosphor regions. Alternatively, scanning laser beam 203 may be comprised of hybrid visible and invisible lasers. For example, a blue laser can be used to generate blue color on screen 201, and the same blue laser could be used to excite phosphors that emit red and green light when excited. Alternatively, a UV laser may be used to excite phosphors that emit green light when excited, and a red and blue laser may be used to produce red and blue color directly on the screen.

A feedback control alignment mechanism can be provided in the system in FIG. 1 to maintain proper alignment of the scanning beam 203 on the desired sub-pixel to achieved desired image quality. The screen 201 is used to provide a screen feedback signal to indicate the alignment status of the scanning beam 203. When the alignment has an error, the control module within laser module 250 responds to the error in the screen feedback to control the scanning beam 203 to compensate for the error. Such feedback control can include reference marks on the screen 201, both in the fluorescent area and in one or more peripheral area outside the fluorescent area, to provide feedback light that is caused by the scanning beam 203 or a separate invisible laser beam (for example an IR beam from an IR laser) and represents the position and other properties of the scanning beam on the screen 201. The feedback light can be measured by using one or more optical servo sensors to produce a feedback servo signal. A servo control in the laser module 250 processes this feedback servo signal to extract the information on the beam positioning and other properties of the beam on the screen and, in response, adjust the direction and other properties of the scanning beam 203 to ensure the proper operation of the display system.

In one example, a feedback servo control system can be provided to use peripheral servo reference marks positioned outside the display area, unobservable by the viewer, to provide control over various beam properties. The various beam properties can include the horizontal positioning along the horizontal scanning direction perpendicular to the fluorescent stripes, the vertical positioning along the longitudinal direction of the fluorescent stripes, the beam focusing on the screen for control the image sharpness, and the beam power on the screen for control the image brightness. In another example, a screen calibration procedure can be performed at the startup of the display system to measure the beam position information as a static calibration map. By creating the static calibration map, the exact positions of sub-pixels on the screen will be known. This calibration map is then used by the laser module 250 to control the timing and positioning of the scanning beam 203 to achieve the desired color purity. In another example, a dynamic servo control system can be provided to regularly update a pre-existing static calibration map during the normal operation of the display system. The update of the preexisting calibration map can be performed by using servo reference marks in opaque regions of the fluorescent area of the screen to provide the feedback light without affecting the viewing experience of a viewer.

The opaque regions, as disclosed above, are a type of reduced, limited or no light propagation or emission region. As used herein, opaque light propagation regions are regions which either are not targeted to receive light from a light source (e.g. the region is not targeted by the scanning laser beam 203 and the region is not disposed directly (or only partially) in the light path between the viewer and the phosphor regions 202, when the phosphor regions are emitting light in a lambertian manner, when excited by the excitation light). This is in contrast to the light propagation regions, usually between the opaque light propagation regions, where either the light source is mostly directly intersecting the light propagation region or more directly in the light path between the viewer and the phosphor regions 202, when the phosphor regions are emitting light.

Figure 2:
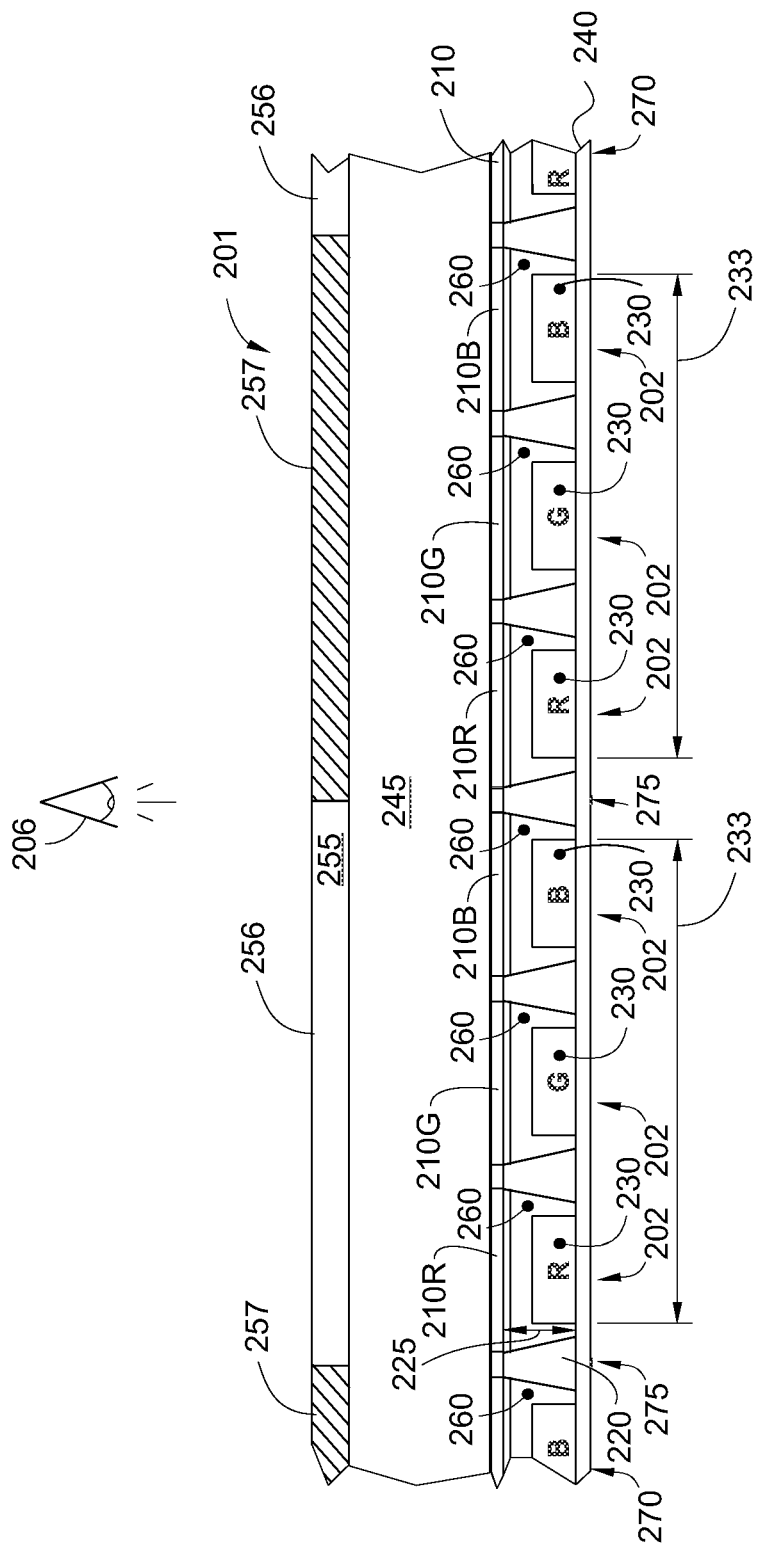
FIG. 2 is a partial cross-sectional view of screen taken at section A-A in FIG. 1.

FIG. 2 is a partial cross-sectional view of screen 201 taken at section A-A in FIG. 1. The screen 201 can include a plurality of phosphor regions 230 mounted on a substrate 240, a film patterned retarder (FPR) 255 and opaque regions, such as standoff dividers 220. The screen 201 can further include a color filter layer 210 and a support layer 245. Layer 245 could be a combination of filter layers coated or pigmented to render various functions such as neutral density filter, or a spectral filter to enhance RGB color or block UV light The color filter layer 210 and additional filter layers and FPR can be positioned on the layer surface of the screen 201 facing the viewer 206, as determined from the laser source 250. There could be an additional large monolithic polycarbonate or glass sheet 288 (not shown) between the viewer 206 and the tiled screen material for safety reasons. The monolithic polycarbonate or glass sheet 288 could serve other purpose of UV blocking layer or spectral density film. The transparent substrate 240 can be positioned on the opposite side of the screen 201, and the phosphor regions 230 can be disposed between the outer layers (outer layers are one or all e.g. 210, 245, 255) and substrate 240 as shown. The substrate 240 will be expanded on in greater detail in the next section. The screen 201 as depicted with various components are greatly exaggerated both for visibility and to clarify aspects of the invention. Other desirable characteristics of the layers of 201 include having a low coefficient of thermal expansion and low moisture absorption, and being readily manufacturable in thin layers. In addition, the layers are preferably comprised of a material that is not brittle and does not break-down with exposure to UV light and discolor over the lifetime of the display system 100. In some embodiments, the layers comprise a polyethylene terephthalate (PET) films or other polymeric plastic films, which largely satisfies the above requirements. In addition, there is great benefit to having plastic layered 201 for rollability and transportation purposes. The color filter layer 210 is a thin substrate, typically plastic substrate which is less than 0.5 mm in thickness, and may be configured with filter elements 210R, 210G, and 210B that each narrow the gamut of the particular color light passing through the filter element. In general all the layers herein are relatively flexible substrates or sheets that are held in place by other structural elements of the screen 201 be it standoffs or other structural elements. In the embodiment illustrated in FIG. 2, the color filter layer 210 includes red, green, and blue filter elements, which are positioned to align with corresponding red, green, or blue phosphor regions 230, denoted by R, G, and B, respectively. The filter elements 210R, 210G, and 210B may be formed with a lithographic or ink jet or gravure printing process on the requisite portions of the color filter layer 210 prior to the assembly of screen 201. In the embodiment illustrated in FIG. 2, the filter elements 210R, 210G, and 210B are configured as elongated strips (perpendicular to page) that, like the phosphor regions 230 and the standoff dividers 220, extend vertically across screen 201, i.e., parallel to arrow 209 in FIG. 1.

The standoff dividers 220 separate the phosphor regions 230 from each other and prevent the outer layers from touching the phosphor regions 230. Thus, the standoff dividers 220 form a first region 260 around each of the phosphor regions 230. One example material for the standoff dividers 220 is a photosensitive resin. Alternative means for the standoff material is a patterned polymer. The photosensitive resin may be applied as an imageable photo-resist laminate to a substrate, such as the color filter layer 210 or other planar structural member, and selectively exposed to the requisite light energy, such as UV light and the remainder of the photo-resist laminate removed. The polymer standoff can be also formed by either a replication process using planar molds or roll to roll process using cylindrical molds with UV curing applied. When patterned appropriately, the standoff dividers 220 can be formed in the desired regions on the substrate. Note that if the color filter layer 210 is not present, the standoff dividers can be formed on any other outer layer including a passive transparent layer. As shown, the standoff dividers 220 come in touch with the substrate 240 and are usually contact glued to the substrate for good adhesion and structural integrity. In some embodiments, the standoff dividers 220 are configured as elongated strips positioned between the phosphor regions 230. In one embodiment, the standoff dividers 220 have a height 225 of between about 50 and 100 μm or greater than the phosphor height region.

One or more phosphor regions 230 are formed from the phosphor stripes 202 and are configured to emit light of a frequency range which is detected by a viewer as a color or combination of colors when one or more of the phosphor regions are excited by an excitation beam, such as scanning laser beam 203. Thus, each pixel element of the screen 201 may include one or more phosphor regions 230, where each phosphor region 230 acts as a sub-pixel of a larger pixel element. In the embodiment illustrated in FIG. 2, one dimension of a pixel element, i.e., pixel width 233, is defined by the width of three phosphor regions 230, and the orthogonal dimension, i.e., out of the page, or vertical, is defined by the excitation laser beam spot size. In such an embodiment, because the phosphor stripes 202 are continuous stripes, the vertical position of each pixel element is not fixed and may be selected as desired by adjusting the vertical position at which the excitation laser beam is directed to each of the phosphor stripe 202. In other embodiments, the standoff dividers 220 may define both dimensions of each of the phosphor regions 230, so that the phosphor regions 230 are separated on all sides from adjacent phosphor regions by the standoff dividers 220 formed in a grid pattern. Each of the phosphor stripes 202 is spaced at a pitch of X μm, so that pixel width 233 of a pixel element on the screen 201 is 3X μm. For example if X=400 um the pixel pitch is 1200 um. In one embodiment, each of the phosphor stripes is spaced at a pitch of 400 μm with a pixel pitch of 1200 μm. In yet other embodiments, the pixel elements of the screen 201 may include separate phosphor regions rather than portions of the phosphor stripes 202. For example, each sub-pixel may be a discrete and isolated phosphor dot or rectangle of one particular light-emitting phosphor material.

The substrate 240 is the first layer lit by the laser module 250 by prior to the light reaching the phosphor region 230. Substrate 240 contains multiple functions such as high transmission of UV light, reflecting light for servo purposes, and efficiently recycling the visible light to the viewer. It contains at least a co-extruted multi-layer film (show reference) and a servo printed layer. The servo printed layer with servo marks 275 is normally aligned with the standoff region so that it does not hinder the UV light reaching the phosphor region 230. The support layer 245 can be positioned over the phosphor regions 230. The support layer can be a solid transparent surface which substantially or completely covers the phosphor region 230. The support layer 245 can be in connection with the color filter layer 210 or it can be in connection with the first regions 260. The support layer can be relatively thick in comparison to the phosphor region but is still relatively flexible The support layer 245 need not be transparent to UV light. In one embodiment, a UV filtering layer (not shown) may be used to prevent UV light from reaching the viewer 206. In another embodiment, the transparent surface may be either selected for or adapted against UV transparency.

The FPR 255 is a transparent or partially transparent sheet. The FPR 255 can be composed of multiple layers. In one embodiment, the multiple layers includes a polarizing film, such as triacetyl cellulose (TAO) film, which can be used to polarize the light emanating for the phosphor region 230. The multiple layers can further include alternating left and right circularly polarizing wave plates, which are used to separate information to the viewer wearing polarization glasses. The FPR 255 can be positioned over the support layer 245 over the color filter layer 210, or directly over the phosphor region 230 thereby creating the first region 260 in conjunction with the standoff dividers 200. The FPR 255 can create a plurality of right and left circular polarization regions that with complement circular polarization eyewear establishes distinct left eye visible regions 256 and right eye visible regions 257. The FPR regions 256 and 257 can be separated into various organizations, such as columns, rows, checkerboard patterns or other formations which would allow an approximately equal division of the image produced on the screen 201 between the right eye polarization regions 256 and the left eye polarization regions 257. The FPR 255 can be arranged in columns that correlate to the pixel width 233.

The FPR 255 useable with embodiments of the present invention can be any film or layer which de-correlates two images presented in an interleaved manner simultaneously so as to create multiple images for the viewer 206, such as a stereo image used to generate the illusion of 3D. Exemplary embodiments can include a FPR or a film patterned color-shifter. An LCD-based display system configured with a FPR is described in greater detail in U.S. Pat. No. 5,327,285, entitled "Methods for manufacturing micropolarizers" and granted Jul. 5, 1994, and is incorporated by reference herein. A projector based system configured with a film patterned color shifter is described in greater detail in U.S. Pat. No. 7,959,295, entitled "Spectral separation filters for 3D stereoscopic D-cinema presentation" and granted Jun. 14, 2011, and is incorporated by reference herein.

Laser module 250 (shown in FIG. 1) forms an image on screen 201 by directing scanning laser beam 203 to phosphor stripes 202 and modulating scanning laser beam 203 to deliver a desired amount of optical energy to each phosphor region 230 of screen 201. Each phosphor region 230 outputs light for forming a desired image by the emission of visible light created by the selective laser excitation thereof by scanning laser 203. Some of the light emitted by phosphor region 230 will be incident on standoff dividers 220, which may absorb and/or transmit said light, depending on the material from which standoff dividers 220 are formed and the angle of incidence of the light with respect to the surfaces of standoff dividers 220. Transmission of incident light from phosphor region 230 into an adjacent phosphor region allows colors from different phosphor regions to mix, thereby degrading color purity of the image, while absorption of such light reduces the amount of light that ultimately reaches viewer 206. Embodiments of the invention contemplate the use of a material having a low-index of refraction that is disposed in first region 260 between phosphor regions 230 and standoff dividers 220. The presence of the low-index material in first region 260 minimizes the absorption and/or transmission by standoff dividers 220 of light emitted by phosphor regions 230, thereby allowing more of the light emitted by phosphor regions 230 to propagate through color filter layer 210 and reach viewer 206. Alternatively region 260 can be air.

The image produced on the screen 201 will be filtered through the FPR 255. The FPR 255 in combination with the polarizer will polarize the light produced by the phosphor regions 230. Only light of a certain polarity will be allowed through the FPR 255 due to the mated linear polarizer. The circular polarization phasing of the light allowed through the FPR 255 is different between the right eye regions 256 and the left eye regions 257. The light passing through the right eye regions 256 corresponds to a first image and the light passing through the left eye regions 257 corresponds to a second image. Therefore, one image will be circularly polarized phase shifted with the other. The viewer 206 will have an appropriate circularly polarized phase filtering viewer device (not shown) which allows the viewer to see the first image with the right eye and the second image with the left eye.

In the embodiment illustrated in FIG. 2, the screen 201 can include a reflective servo layer (not shown) and a reflector film (not shown). Further the reflective servo layer can have a plurality of positioned marks disposed thereon. When the laser hits at least one of the plurality of positioned marks, the laser will either be dispersed or reflect back to the servo (not shown). Based on known positioning and shape of the plurality of positioned marks, the position of the reflected laser can be determine based on calculable parameters, such as reflection angle and time of receipt. An LPD-based display system configured with a servo beam is described in greater detail in U.S. Patent Application Publication No. 2010/0097678, entitled "Servo Feedback Control Based on Designated Scanning Servo Beam in Scanning Beam Display Systems with Light-Emitting Screens" and filed Dec. 21, 2009, and is incorporated by reference herein.

Though described as including substrate 240 with phosphor layers 230, it is envisioned that the methods described herein could be beneficially applied to other image devices. The type of image production in the multi-layer screen 201 is not intended to be limiting of possible embodiments.

Figure 3A:
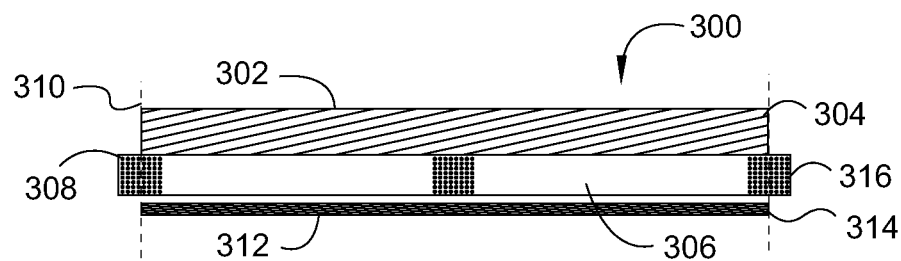
FIGS. 3A-3C depict a multi-layer screen according to one or more embodiments.
Figure 3B:
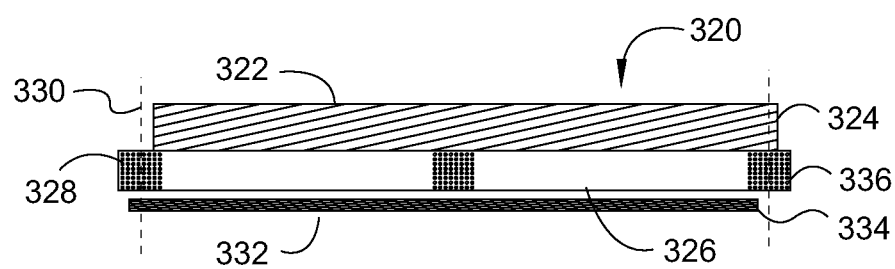
Figure 3C:
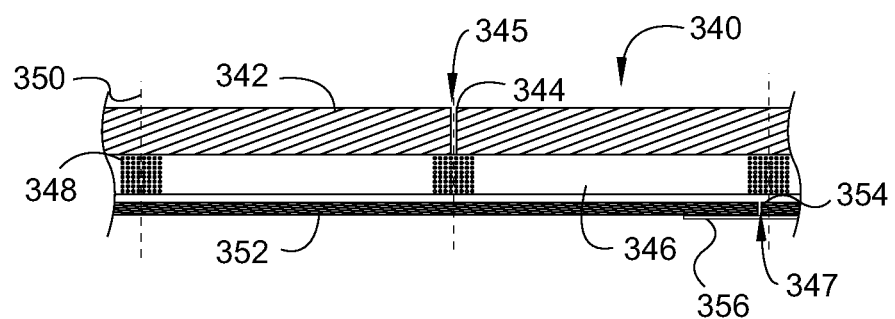

FIGS. 3A-3C depict a multi-layer screen according to one or more embodiments. Certain embodiments, described herein include positioning the edge regions in conjunction with light propagation regions, such as opaque regions, formed in one or more layers or regions between primary light emitting regions. Further embodiments described herein disclose the formation of non-overlapping edge regions in the overlying layers. By controlling the position and the transmission of light through the edge regions, the visibility of the edge regions to the viewer can be diminished and in some cases eliminated. The elements of various embodiments are exaggerated for clarity.

FIG. 3A depicts a multi-layer screen 300 according to one embodiment. The multi-layer screen 300 can include a first layer 302. The first layer 302 can be a partially transmissive layer, such as a UV filtering layer or a color filter layer. The first layer can include a plurality of first edges 304. The number of first edges 304 will correspond to the number of sides in the first layer's 302 plane. As two sides in a plane of the first layer 302 are visible from this perspective, two first edges 304 are also visible.

The first layer 302 can be formed over a second layer 306. The second layer 306 can be one or more layers described above with references to FIG. 2, such as a phosphor layer. In one embodiment, the second layer is the transparent substrate 240. The second layer 306 can have one or more opaque regions 308, shown here as three (3) opaque regions 308. The opaque regions 308 can be formed either on or in the second layer 306. The opaque regions 308 can be bisected by an imaginary bisecting line 310. The first edges 304 are formed adjacent to the opaque regions 308, shown here as being flush with the imaginary bisecting lines 310. As with the first layer 302, the second layer 306 has a plurality of second edges 316, shown here as two second edges 316.

A third layer 312 can be formed in connection with the second layer 306. The third layer 312 can be a feedback layer, such as a servo layer. The third layer 312 can have a plurality of third edges 314. As with the first layer 302, the number of third edges 314 will correspond to the number of sides in a plane of the third layer 312. As two sides of the third layer 312 are visible from this perspective, two third edges 314 are also visible. Shown here, the third edges 314 are also in line with the bisecting line 310 of the opaque regions.

The positioning of the edges shown here allows for greater control of the visibility of these edges to the viewer. As the first edges 304 and the third edges 314 are formed in conjunction with an opaque region 308, and the second edges 316 are formed at the opaque regions 308, light from the light source or scanning laser beam is not transmitting in a manner that causes imaging (as in that the excitation light may be off during this period of the scan) through the first edges 304, the second edges 316 and the third edges 314. This prevents reflection or refraction at the first edges 304, the second edges 316 and the third edges 314, making the first edges 304, the second edges 316 and the third edges 314 less visible. Though shown as only three layers, it is understood that a multi-layer screen 300 may have more or fewer layers depending on the needs of the viewer.

FIG. 3B depicts a multi-layer screen 320 according to another embodiment. The multi-layer screen 320 shown here includes a first layer 322, a second layer 326 and a third layer 332. The first layer 322 can include a plurality of first edges 324, depicted here as two first edges 324. The second layer 326 can include a plurality of opaque regions 328 and a plurality of second edges 336, depicted here as three opaque regions 328 and six second edges 336 respectively. The third layer 332 includes a plurality of third edges 334, depicted here as two third edges 334.

The first edges 324, the second edges 336 and the third edges 334 are each shown in relation to an imaginary bisecting line 330, which bisects the opaque regions 328. The first edges 324 shown here as not aligned with the bisecting line 330, the second edges 336 or the third edges 334. The second edges 336 and the third edges 334 are also not aligned with the bisecting line 330 or one another. This avoids a common edge between the first edges 324, the second edges 336 and the third edges 334. Though the first edges 324, the second edges 336 and the third edges 334 are not aligned, each edge is capable of being formed adjacent to an opaque region.

FIG. 3C depicts a multi-layer tiled screen 340 according to another embodiment. The multi-layer tiled screen 340 includes a plurality of first layers 342, a plurality of second layers 356 and a plurality of third layers 352. The plurality of first layers 342, depicted here as two first layers 342 can include a plurality of first edges 324, depicted here as two first edges 344. Formed between the two first edges 344 is a first gap 345. The first gap 345 may be larger or smaller than shown here. The second layer 346 can include a plurality of opaque regions 348, depicted here as three opaque regions 348. The second layer 346 can further include a plurality of second edges, similar to those shown in relation to FIGS. 3A and 3B. The third layer 352 includes a plurality of third edges 354, depicted here as two third edges 354. As with the first layer 342, the third layer 352 can include a third gap 347 formed between the plurality of third edges 354. The screens 340 can be connected across the first gap 345, the third gap 347 or combinations thereof using a transparent tape 356, shown here as connected across the third gap 347 using the transparent tape 356. The transparent tape 356 is depicted here as having edges which do not coincide with the opaque regions 348. However, in one or more embodiments where transparent tape 356 is used, the edges of the transparent tape 356 are positioned layer adjacent to the opaque regions to reduce visibility of the edges of the transparent tape.

As described previously, the first edges 344 and the third edges 354 are each shown in relation to an imaginary bisecting line 350, which bisects the opaque regions 348. The first edges 344 shown here as not aligned with the bisecting line 350, the second edges or the third edges 354. The second edges are not aligned with the bisecting line 350. Further, the first edges 344 and the third edges 354 are not layer adjacent to the same opaque region, thus avoiding a common edge between the first edges 344 and the third edges 354 and a common gap between the first gap 345 and the third gap 347.

It is believed that avoiding a common edge provides further support to the multi-layer tiled screen 340. When a common edge is used in available tiled designs, the common edge becomes a flex point for the screen. This flex point allows for both ready bending of the screen, stress on the adhesive connection and transference of force to abutting screens. The overlap of the offset edges in the layers of the multi-layer tiled screen 340 creates a continuous sheet and provides additional stability to the multi-layer tiled screen 340. The lamination of the sheet layers using one or many adhesive techniques adds the creation of a sturdy and stable large overall compound single sheet, made up of smaller sheets each sheet comprising layers, which as shown above are interleaved together and laminated one layer to another.

Though FIGS. 3A-3C are described with reference to the first edges, the second edges and the third edges positioned in optical connection with an opaque region, opaque regions are not necessary for the embodiments described herein. Specifically, in one or more embodiments, the opaque regions can be replaced with a region which does not receive light or radiation from the scanning laser beam or other internal light sources. In this embodiment, the edge gap formed between the edges will be between the emission areas on the viewer side (such as between the phosphor regions) and between the regions receiving the scanning laser beam on the light engine side. In this way, the excitation beam never hits the edge gap or the edges and the emission from the phosphors only minimally hits the edge gap or edges.

Beam scanning in the display systems described in this document can be implemented by two scanners that scan the excitation beams of light in two orthogonal directions, e.g., the horizontal and vertical directions. The horizontal scanner can be implemented by a polygon and the vertical scanner can be implemented by a galvo scanner. Various scanning techniques can be implemented to operate the two scanners to scan the excitation beams 715.

Given that a system is depicted in this embodiment, it is understood that further compensation is possible to ensure less visibility of horizontal and vertical gaps in the final stitched panel 201 in front of the laser module 250. Even though the edges and corresponding gaps are in the opaque regions or near scan line, the edges might still show up as dimming or discolored line artifacts on the screen. This can be addressed by boosting the excitation light 203 by laser module 250 around the area of the phosphor region 220 in proximity to the gaps. Examples are, in the vertical edge case: if the edge is in the opaque region at the Blue to Red boundary, the excitation energy 203 can be boosted for one or two subpixels around that gap for that subpixel area. Similarly, in the horizontal edge case: the horizontal scan line produced by excitation laser 203 in the scan can be adjusted in intensity depending on its location relative to the horizontal gap.

Figure 4:
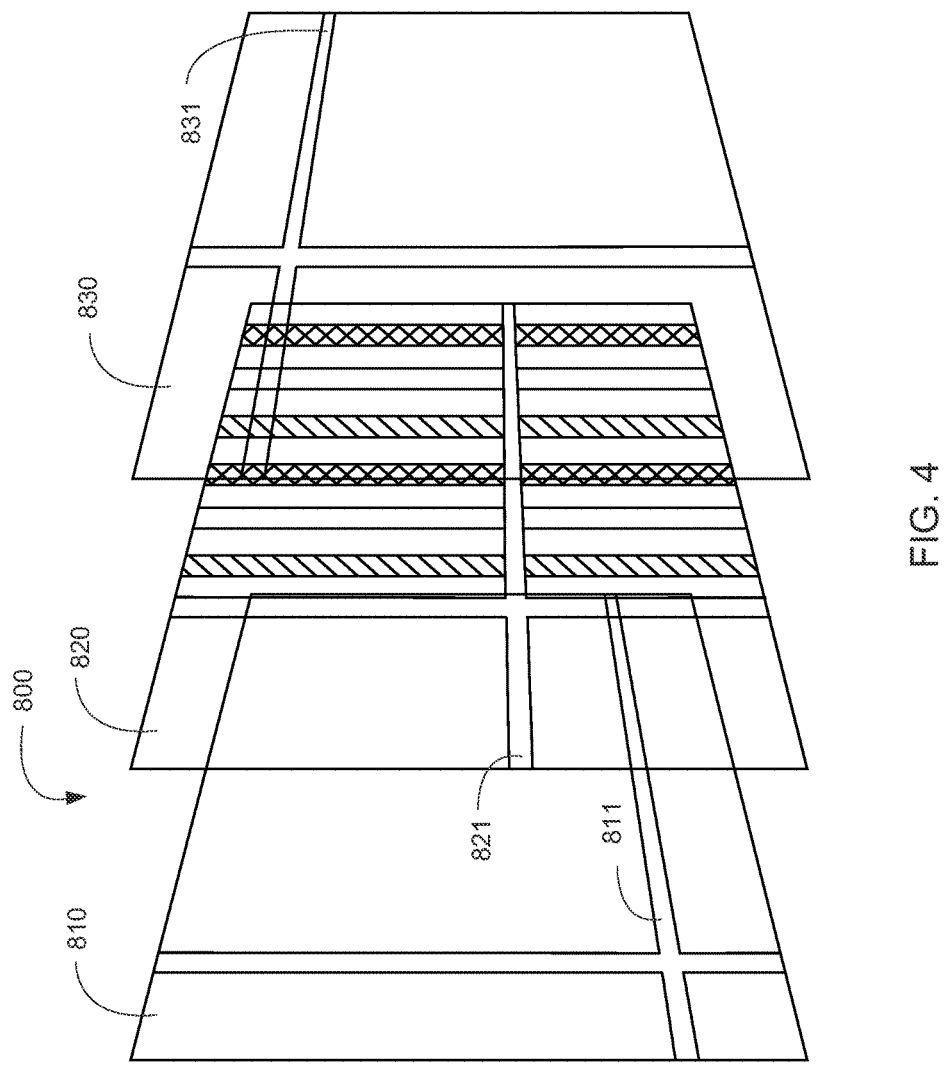
FIG. 4 illustrates a multi-layer screen having a vertical and horizontal gap sheet alignment according to embodiments described herein.

FIG. 4 illustrates a multi-layer screen having a vertical gap sheet alignment according to embodiments described herein. In the vertical sheet alignment situation, there can be vertical strips of phosphor and vertical opaque regions, such as strips of standoff dividers. The goal here is to insure that the gaps between placed layers within the screen vertically positioned to each other are placed in a manner to not occur in line with the phosphor regions. In a similar manner to the horizontally placed abutting layer films, the gaps between abutted layer films for the vertically placed layer films can be in the same location as the above or below layer film gaps. As depicted here, there are three layers: a servo layer 810; a phosphor layer 820; and a filter layer 830. Each of the three layers has abutting layers extending the overall dimension of the composite sheet of the three layers.

In one embodiment, the multi-layer screen 800 includes a plurality of servo layers 810 with a servo layer gap 811, where the abutting two servo layers 810 abut each other. The location of the servo layer gap 811 is in line with the scan of the laser beam across the screen 800, such that the servo layer gap 811 is approximately centered along the scan of the beam. The next layer in the sheet layer stack is the phosphor layer 820 including a phosphor layer gap 821. Again here the phosphor layer gap, where the abutting two phosphor layers 820 abut each other, is located in a second position, distinct from overlapping with the position of the servo layer gap 811. This phosphor layer gap 821 is located again in line with a scan of the laser beam as the laser beam scans across the composite sheet, but distinct from the servo layer gap 811 position and hence distinct from the first laser beam scan position. The subsequent layer in the sheet layer stack is the filter layer 830 including a filter layer gap 831. Again here the filter layer gap 831, where the abutting two filter layers 831 abut each other, is located in a third position, distinct from the overlapping with the position of the servo layer gap 811 and the phosphor layer gap 821. This filter layer gap 831 is located again in line of a scan of the laser beam as the laser beam scans across the composite sheet, but distinct from the servo layer gap 811 position and hence distinct from the first laser beam scan position as well as distinct from the phosphor layer gap 821 position and hence distinct from the second laser beam scan position.

Of course, there may be more layers that are to be abutted to each other either in different layers or to make the screen even larger in the vertical or horizontal. Each of any additional layers will have staggered gaps, so as to minimize overlapping gaps in the layer stack.

Also there is the possibility that the overall screen may need to be both vertically and horizontally enlarged, thereby including the staggering of the layers in both the horizontal and vertical. This staggering can allow a fully extensible sized screen with minimal overlap of the layers in the stack minimizing the apparent visual identification of the gaps in the screen.

In one embodiment, a system can include a light generator; a multi-layer screen which permits light from the light generator to propagate through at least one or more layers of the multi-layer screen where at least one layer is scanned by a nearly fixed aperture sized beam of light along a first scan line; and a first layer within the multi-layer screen, where the first layer is two films abutted against each other, the abutment includes a first film layer gap between the two films where the first film layer gap between the two films is coincident with the first scan line. The coincidence between the first film layer gap and the first scan line can have the gap exclusively in proximity to the scanned light aperture of the scan line. The proximity can be based on a stacked manner. At least one layer can be scanned by a nearly fixed aperture sized beam of light along a second scan line, where the second scan line is distinct from the first scan line, where the multi-layer screen further comprises a second layer within the multi-layer sheet, and where the second layer is two films abutted. The coincidence between the second film layer gap and the second scan line can have the gap exclusively in proximity to the scanned light aperture of the second scan line. A layer within the multi-layer screen can have at least one phosphor region.

In another embodiment, a system can include a light generator configured to produce light, a multi-layer screen configured to permit light from the light generator to propagate through at least one or more layers of the multi-layer screen where at least one layer is scanned by a nearly fixed aperture sized beam of light along a first scan line and a first layer plane within the multi-layer screen, the first layer plane comprising two layers, wherein the edge of each of two layers within the plane abut against each other creating a first layer plane gap between the two layers, and wherein the first layer plane gap between the two films is coincident with the first scan line. In a further embodiment, the light generator can be further configured to render image information in producing the scan line in line with the second gap. In a further embodiment, the light generator is further configured to render image information in producing the scan line not in line with the second gap.

In sum, embodiments of the present invention set forth a multi-layer display device that is capable of being tiled without showing a visible edge between the screens. The multi-layer tiled screens are then capable of forming single or stereo images. The stereo images can be used for the production of 3D imaging for a single viewer or two images viewed separately by different viewers. It is understood that the two image design could be expanded to more than two viewers, such as by increasing the frame rate and including multiple polarizations of the screen such that more than two images can be accommodated. Advantages of the present invention include viewing 3D content in a large screen format and a better viewing experience for the viewer.

While the foregoing is directed to embodiments of the present invention, other and further embodiments of the invention may be devised without departing from the basic scope thereof, and the scope thereof is determined by the claims that follow.

We claim:

1. A system comprising:
    a light generator configured to produce light; and
    a multi-layer screen, the multi-layer screen configured to permit the light from the light generator to propagate therethrough, the plurality of layers comprising:
        a first light propagation layer having a plurality of first light propagation regions and a plurality of second light propagation regions;
        a second layer comprising one or more abutted layers disposed within a common plane, wherein the abutted edges of each of the abutted layers are spaced apart by a first gap, wherein the first gap is coincident with a first layer first light propagation region
        a third layer, the third layer comprising one or more abutted layers disposed within a common plane, the abutted layers spaced apart by a second gap wherein the first gap and the second gap are positioned along a bisecting line of one of the first light propagation regions wherein the first gap and the second gap are positioned along distinct bisecting lines.

2. The system of claim 1, wherein the second gap is coincident with a second light propagation region.

3. The system of claim 1, wherein the first gap and the second gap are positioned along a common bisecting line.

4. The system of claim 1, wherein the light generator is further configured to boost the light of the second light propagation region around the area of the first gap.

5. The system of claim 1, wherein the first light propagation regions are opaque.

6. The system of claim 1, wherein the multi-layer screen is configured such that light produced by the light generator is not propagated through the first light propagation regions.

7. The system of claim 1, wherein the first light propagation regions are configured such that less light is received or propagated by the first light propagation regions than the second light propagation regions.

8. The system of claim 1, wherein the multi-layer screen is configured such that light produced by the light generator is propagated through the second light propagation regions.

9. The system of claim 1, wherein the second light propagation regions are configured to provide lambertian emission.

10. The system of claim 1, wherein at least two of the plurality of multi-layer screens are connected using a transparent tape, where the edges of the transparent tape are coincident with a first light propagation region.

11. The system of claim 1, further comprising a polarizing layer, wherein the edges of the polarizing layer are coincident with a first light propagation region.

12. The system of claim 11, wherein the polarization layer comprises a polarizer and a film patterned retarder.

13. A system comprising:
a light generator configured to produce and direct light; and
a plurality of multi-layer screens, each multi-layer screen comprising:
a servo layer configured to provide feedback and having a first edge;
a second layer configured to deliver visible light to a viewer, configured to have two or more opaque light propagation regions and having a second edge;
a filter layer configured to filter a wavelength of light received from at least the light generator and having a third edge, wherein the first edge and the second edge are not coinciding with the third edge; and
the plurality of multi-layer screens being configured to connect between at least the first edge, the second edge and the third edge of the corresponding screen to create a first gap, a second gap and a third gap respectively, wherein at least one of the first gap, the second gap and the third gap are configured adjacent to one or more opaque light propagation regions wherein the first gap is positioned along a first bisecting line of a first opaque light propagation region and the second gap is positioned along a second bisecting line of a second opaque light propagation region.

14. The system of claim 13, wherein the second layer comprises:
one or more phosphor stripes configured to receive light from the light generator and produce one or more wavelengths of light in response to the light received; and
one or more segments positioned between and in parallel with the phosphor stripes, the segments configured to separate the phosphor stripes from one another.

15. The system of claim 13, wherein at least two of the plurality of multi-layer screens are connected between a first distinct layer and a second distinct layer at the same plane, the first distinct layer and the second distinct layer being abutted to one another, wherein the first distinct layer and the second distinct layer are connected using a third layer, the third layer being layer adjacent to the first distinct layer and second distinct layer.

16. The system of claim 15, wherein the first distinct layer and the second distinct layer are configured to overlap an opaque light propagation region of the second layer.

17. The system of claim 13, wherein the filter layer is a polarizing layer.

18. A system comprising:
a light generator configured to produce a scanning light; and
a multi-layer screen with a plurality of layers, the multi-layer screen configured to permit the light from the light generator to propagate therethrough, the plurality of layers comprising:
a first light propagation layer having a plurality of first light propagation regions and a plurality of second light propagation regions; and
a second layer comprising two or more abutted layers disposed within a common plane, comprising:
a first layer comprising a first abutted edge and a second layer comprising a second abutted edge, the first abutted edge and the second abutted edge having a common plane and spaced apart by a first gap, wherein the first gap is coincident with the first light propagation region of the first light propagation layer; and
the second layer comprising a third abutted edge and a third layer comprising a fourth abutted edge, the third abutted edge and the fourth abutted edge having a common plane and spaced apart by a second gap, wherein the second gap is coincident with a scan line, and wherein at least one layer is scanned by a nearly fixed aperture sized beam of light along the scan line wherein the first gap and the second gap are positioned along a bisecting line of one of the first light propagation regions wherein the first gap and the second gap are positioned along distinct bisecting lines.

19. The system of claim 18, the light generator is further configured to render image information in producing the scan line in line with the second gap.

20. The system of claim 18, the light generator is further configured to render image information in producing the scan line not in line with the second gap.

21. The system of claim 18, wherein the first light propagation region is opaque.

* * * * *